(12) United States Patent
Yamakawa

(10) Patent No.: US 10,780,801 B2
(45) Date of Patent: Sep. 22, 2020

(54) VEHICLE SEAT

(71) Applicant: TACHI-S CO., LTD., Akishima-shi, Tokyo (JP)

(72) Inventor: Takumi Yamakawa, Akishima (JP)

(73) Assignee: TACHI-S CO., LTD., Tokyo (JP)

( * ) Notice: Subject to any disclaimer, the term of this patent is extended or adjusted under 35 U.S.C. 154(b) by 16 days.

(21) Appl. No.: 16/313,019

(22) PCT Filed: May 24, 2017

(86) PCT No.: PCT/JP2017/019440
§ 371 (c)(1),
(2) Date: Dec. 22, 2018

(87) PCT Pub. No.: WO2018/051579
PCT Pub. Date: Mar. 22, 2018

(65) Prior Publication Data
US 2020/0114787 A1    Apr. 16, 2020

(30) Foreign Application Priority Data

Sep. 13, 2016 (JP) .................................. 2016-178782
Sep. 13, 2016 (JP) .................................. 2016-178784

(51) Int. Cl.
*B60N 2/30* (2006.01)
*B60N 2/02* (2006.01)

(52) U.S. Cl.
CPC .... *B60N 2/3045* (2013.01); *B60N 2002/0268* (2013.01); *B60N 2002/0272* (2013.01)

(58) Field of Classification Search
CPC .... B60N 2/3045; B60N 2/6673; B60N 2/667; B60N 2/666; B60N 2002/0268; B60N 2002/0272
(Continued)

(56) References Cited

U.S. PATENT DOCUMENTS 3,463,544 A * 8/1969 Froelich ................ B60N 2/66
                                                 297/284.7
5,947,558 A * 9/1999 Suzuki .................. A47C 7/462
                                                 297/284.4
(Continued)

FOREIGN PATENT DOCUMENTS

JP    58-149954 U    10/1983
JP    64-044355 A    2/1989
(Continued)

OTHER PUBLICATIONS

International Search Report from International Patent Application No. PCT/JP2017/019440, dated Aug. 29, 2017.

*Primary Examiner* — Mark R Wendell
(74) *Attorney, Agent, or Firm* — SGPatents PLLC

(57) ABSTRACT

The present invention relates to a vehicle sheet with a seat back which is provided with a urethane pad covered with a trim cover, and a pressing unit on the reverse side of the urethane pad covered with the trim cover, the pressing unit being formed with a shaft extending laterally and a pair of pressure portions arranged in the vertical direction with respect to the shaft to support both the upper and lower sides of the urethane pad by detecting the intermediate position of turning movement of the pressing unit by means of a turning movement detection unit and stopping the turning movement of the pressing unit, or is configured to press forward the upper side of the urethane pad using the upper pressure portion or the lower side of the urethane pad using the lower pressure portion by turning the laterally-extending shaft of the pressing unit.

17 Claims, 14 Drawing Sheets

(58) Field of Classification Search
USPC .................................................. 297/452.1
See application file for complete search history.

(56) References Cited

U.S. PATENT DOCUMENTS

| | | | | |
|---|---|---|---|---|
| 2015/0246627 A1* | 9/2015 | Shimizu | .................. | B60N 2/66 |
| | | | | 297/216.14 |
| 2016/0374475 A1* | 12/2016 | Aldrich | .................. | A47C 7/462 |
| | | | | 297/284.3 |
| 2018/0035809 A1* | 2/2018 | Schwarzbich | ......... | A47C 7/465 |

FOREIGN PATENT DOCUMENTS

| | | |
|---|---|---|
| JP | 04-026827 U | 3/1992 |
| JP | 04-038758 Y2 | 9/1992 |
| JP | 06-253950 A | 9/1994 |
| JP | 2010-057824 A | 3/2010 |
| JP | 2013-504463 A | 2/2013 |
| WO | WO 2011/029199 A1 | 3/2011 |

\* cited by examiner

VEHICLE SEAT

TECHNICAL FIELD

The present invention relates to a vehicle seat used for a vehicle such as a passenger car and a truck, and relates to a vehicle seat including a support mechanism that presses/supports the back portion of a seated person.

BACKGROUND ART

As a vehicle seat including a support mechanism that presses/supports the back portion of a seated person, in Patent Literature 1, there is disclosed a vehicle seat including a support mechanism that presses 2 positions of the lumbar portion and the pelvic portion.

The support mechanism that presses the lumbar portion and the pelvic portion of a seated person of this vehicle seat disclosed in Patent Literature 1 is configured to include a mechanism unit that presses/supports the lumbar portion and the pelvic portion at right and left 2 positions respectively and to drive the mechanism unit by actuators.

CITATION LIST

Patent Literature

PLT 1: Japanese Unexamined Patent Application Publication No. 2013-504463

SUMMARY OF INVENTION

Technical Problem

The vehicle seat disclosed in Patent Literature 1 is configured to press or support the lumbar portion and the pelvic portion at right and left 2 positions respectively, therefore a mechanism for interlocking the right and left mechanism portions is required, and there are such problems that the number of components increases, the weight becomes heavy, and the material cost increases, and so on.

Also, when it is configured to be driven manually instead of the actuator, a lever dial and the like assisting the operation is required for each, and there is a problem that the operation is troublesome such that the lever dial must be shifted in operation.

Further, when the drive system of the mechanism unit that presses/supports the lumbar portion and the pelvic portion at right and left 2 positions respectively is changed between an electromotive system using the actuator and a manual system, it is hard to make the components common.

The present invention is to solve the problems of the prior art described above, and to provide a vehicle seat including a support mechanism that presses or supports the back portion and the waist portion of a seated person with a configuration of a mechanism unit for respectively pressing or simultaneously supporting the lumbar portion and the pelvic portion being simplified, fewer components configuring the mechanism unit, and components being capable to be made common in changing the drive system in the support mechanism.

Also, the present invention is to solve the problems of the prior art described above, and to provide a vehicle seat including a support mechanism that presses the back portion and the waist portion of a seated person respectively and supports the back portion and the waist portion simultaneously with a configuration of a mechanism unit for respectively pressing or simultaneously supporting the lumbar portion and the pelvic portion being simplified and fewer components configuring the mechanism unit in the support mechanism.

Solution to Problem

In order to solve the problems described above, in the present invention, in a vehicle seat including a seat cushion on which an occupant is seated and a seat back against which the occupant seated on the seat cushion leans the back, the seat back is configured to include an urethane pad whose surface is covered with a trim cover, a pressing unit formed with a shaft extending laterally and pressure portions arranged in the vertical direction with respect to the shaft on the reverse side of a side of the urethane pad which is covered with the trim cover, and a turning movement detection unit that detects an intermediate position of turning movement of the pressing unit, and is configured to press forward an upper side of the urethane pad using an upper pressure portion out of the pressure portions in the vertical direction or to press forward a lower side of the urethane pad using a lower pressure portion out of the pressure portions in the vertical direction by rotating the shaft of the pressing unit and turning the pressing unit, and to support both the upper side of the urethane pad and the lower side of the urethane pad by detecting an intermediate position of turning movement of the pressing unit by means of the turning movement detection unit and stopping the turning movement of the pressing unit in the middle of changing from a state where the pressing unit is turned and the upper side of the urethane pad is pressed forward by the upper pressure portion to a state where the lower side of the urethane pad is pressed forward by the lower pressure portion or changing the state reversely.

Also, in order to solve the problems described above, in the present invention, in a vehicle seat including a seat cushion on which an occupant is seated and a seat back against which the occupant seated on the seat cushion leans the back, the seat back is configured to include an urethane pad whose surface is covered with a trim cover, a resin panel that supports a part of the urethane pad on the reverse side of a side of the urethane pad which is covered with the trim cover, a pressing unit formed with a shaft extending laterally and pressure portions arranged in the vertical direction with respect to the shaft, and a turning movement detection unit that detects turning movement of the pressing unit, and is configured to press forward an upper side of the urethane pad through the resin panel using an upper pressure portion out of the pressure portions in the vertical direction by rotating the shaft of the pressing unit in one direction and turning the pressing unit, to press forward a lower side of the urethane pad through the resin panel using a lower pressure portion out of the pressure portions in the vertical direction by rotating the shaft of the pressing unit in a direction opposite to the one direction, and to hold the resin panel against the upper side of the urethane pad using an upper pressure portion out of the pressure portions in the vertical direction by detecting an intermediate position of turning movement of the pressing unit by the turning movement detection unit in the middle of rotating the shaft of the pressing unit in the one direction or in a direction opposite to the one direction and turning the pressing unit and stopping turning movement of the pressing unit and to hold the resin panel against the lower side of the urethane pad using a lower pressure portion out of the pressure portions in the vertical direction.

Further, in order to solve the problems described above, in the present invention, in a vehicle seat including a seat cushion on which an occupant is seated and a seat back against which the occupant seated on the seat cushion leans the back, the seat back includes an urethane pad whose surface is covered with a trim cover, a pressing unit formed with a shaft extending laterally and pressure portions arranged in the vertical direction with respect to the shaft on the reverse side of a side of the urethane pad which is covered with the trim cover, and a turning movement detection unit that detects an intermediate position of turning movement of the pressing unit, and is configured to detect an intermediate position of turning movement of the pressing unit by means of the turning movement detection unit in the middle of changing from a state where the upper side of the urethane pad is pressed forward by an upper pressure portion out of the pressure portions in the vertical direction by rotating the shaft of the pressing unit and turning the pressing unit to a state where the lower side of the urethane pad is pressed forward by a lower pressure portion out of the pressure portions in the vertical direction or changing the state reversely.

Also, in order to solve the problems described above, in the present invention, in a vehicle seat including a seat cushion on which an occupant is seated and a seat back against which the occupant seated on the seat cushion leans the back, the seat back is configured to include an urethane pad whose surface is covered with a trim cover, a resin panel that supports a part of the urethane pad on the reverse side of a side of the urethane pad which is covered with the trim cover, a pressing unit formed with a shaft extending laterally on the reverse side of a side of the urethane pad which is covered with the trim cover and pressure portions arranged in the vertical direction with respect to the shaft, and a turning movement detection unit that detects a turning movement position of the pressing unit that simultaneously effects, by rotating the shaft of the pressing unit in one direction or in a direction opposite to the one direction, to hold the resin panel against the upper side of the urethane pad using an upper pressure portion out of the pressure portions in the vertical direction and to hold the resin panel against the lower side of the urethane pad using a lower pressure portion out of the pressure portions in the vertical direction.

Advantageous Effects of Invention

According to the present invention, it has become possible to select the rotation stop position of the torsion bar from 3 states, and to respectively press or simultaneously support the lumbar portion and the pelvic portion of an occupant seated on the seat.

Also, according to the present invention, it has become possible to detect the intermediate position of turning movement of the torsion bar, and to stop turning movement of the torsion bar at any position. Thereby, it has become possible to simultaneously support the lumbar portion and the pelvic portion of an occupant seated on the seat.

Also, according to the present invention, it has become possible to simplify the configuration of the mechanism unit that presses/supports the lumbar portion and the pelvic portion of an occupant seated on the vehicle seat respectively, and to configure the mechanism unit with fewer components.

Further, according to the present invention, it has become possible to make the components common when the support mechanism drive system that presses/supports the back portion of an occupant seated on the vehicle seat is changed.

Further, according to the present invention, it is possible to improve reproducibility and reliability in measuring the characteristics of the seat back.

DESCRIPTION OF EMBODIMENTS

According to the present invention, in a vehicle seat including a seat cushion on which an occupant is seated and a seat back against which the occupant seated on the seat cushion leans the back, the seat back includes an urethane pad whose surface is covered with a trim cover and a pressing unit formed with a shaft extending laterally on the reverse side of a side of the urethane pad which is covered with the trim cover and pressure portions arranged in the vertical direction with respect to the shaft, and is configured to press forward the upper side of the urethane pad using the upper pressure portion out of the pressure portions in the vertical direction by rotating the shaft of the pressing unit extending laterally in one direction, to press forward the lower side of the urethane pad using the lower pressure portion out of the pressure portions in the vertical direction by rotating the shaft of the pressing unit extending laterally in a direction opposite to the one direction, to be provided with a function of stopping the pressing unit at an intermediate position, and to be thereby capable of setting according to the preference of the occupant seated.

Also, according to the present invention, in a vehicle seat including a seat cushion on which an occupant is seated and a seat back against which the occupant seated on the seat cushion leans the back, the seat back includes an urethane pad whose surface is covered with a trim cover and a pressing unit that is located on the reverse side of a side of the urethane pad which is covered with the trim cover, and is configured to press forward the upper side of the urethane pad by turning the pressing unit in one direction, to press forward the lower side of the urethane pad by turning the pressing unit in a direction opposite to the one direction, to arrange a means for detecting an intermediate position of turning movement of the pressing unit to have a function of notifying the occupant of an event that the pressing unit has come to the intermediate position of turning movement, and to be thereby capable of setting according to the preference of the occupant seated.

Below, examples of the present invention will be explained using the drawings.

Example 1

Figure 1:
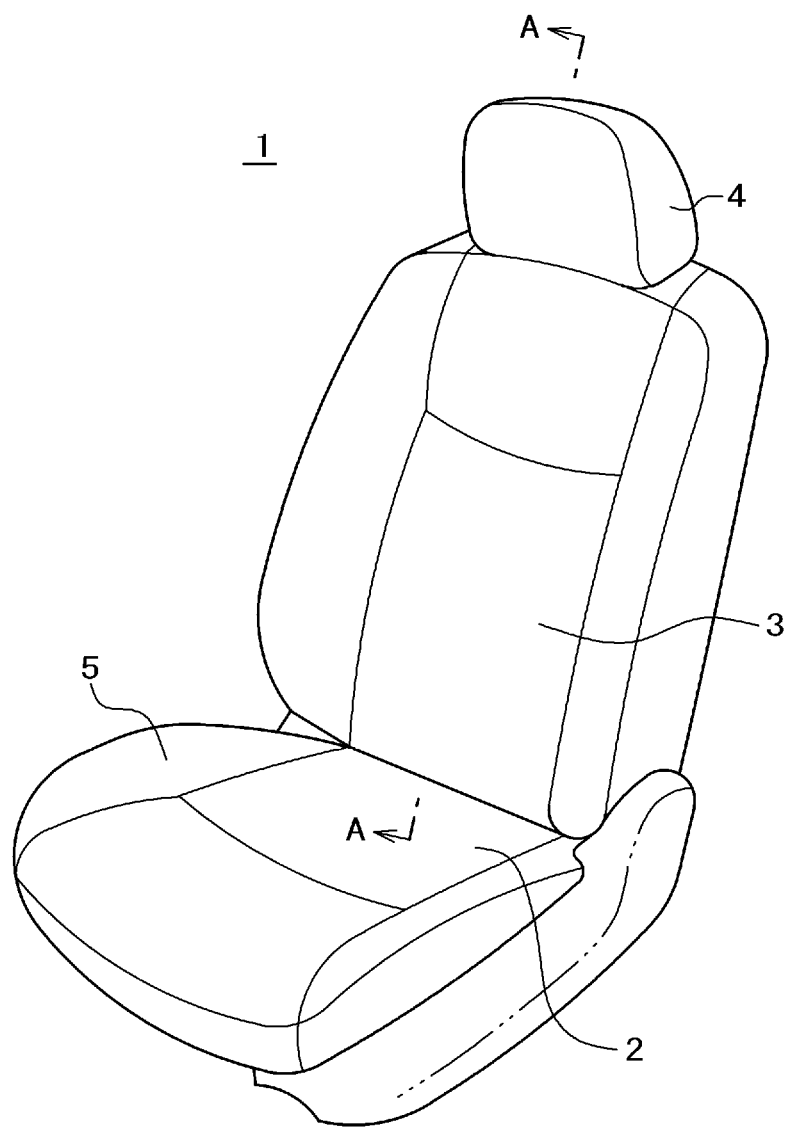
FIG. 1 is a perspective view of a vehicle seat that is an object of the present invention.

FIG. 1 shows a configuration of a vehicle seat 1 that is an object of the present invention. The vehicle seat (seat) 1 includes a seat cushion 2 on which an occupant is seated, a seat back 3 against which the occupant seated on the seat cushion 2 leans the back, a head rest 4 that supports the head part of the occupant, and a side support 5.

Figure 2:
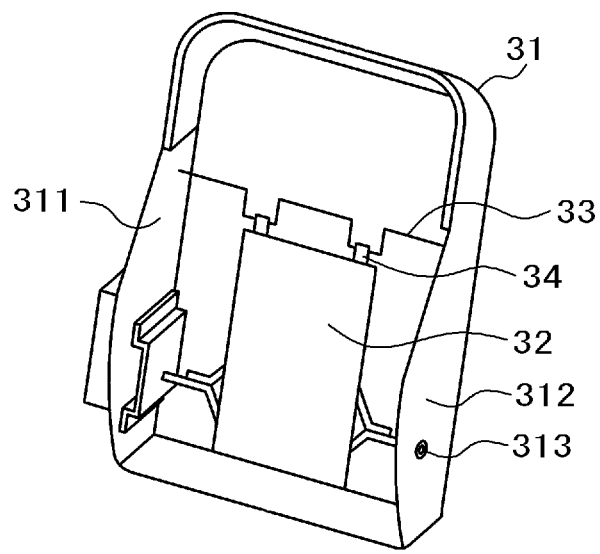
FIG. 2 is a perspective view of a seat back which shows a state where a urethane pad is detached from a seat back of a vehicle seat related to Example 1 of the present invention.

FIG. 2 shows a state where members on the front side (the surface on the side the back of the occupant seated contacts) of the seat back 3 are detached. 31 is a seat frame, and configures the outline shape of the seat back 3. 32 is a resin panel, and contacts the back surface of a urethane pad 39 (refer to FIG. 6). 33 is a spring wire, is extended between side plates 311 and 312 on both sides of the seat frame 31, and hooks 34 which are attached to the upper end part of the resin panel 32 to hold the resin panel 32.

Figure 3:
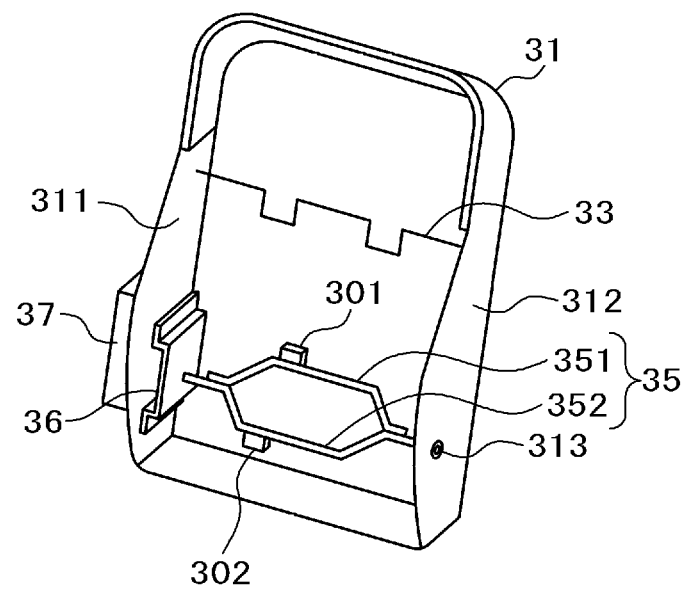
FIG. 3 is a perspective view of a seat back that shows a state where a urethane pad and a resin plate are detached from a seat back of a vehicle seat related to Example 1 of the present invention.
Figure 4:
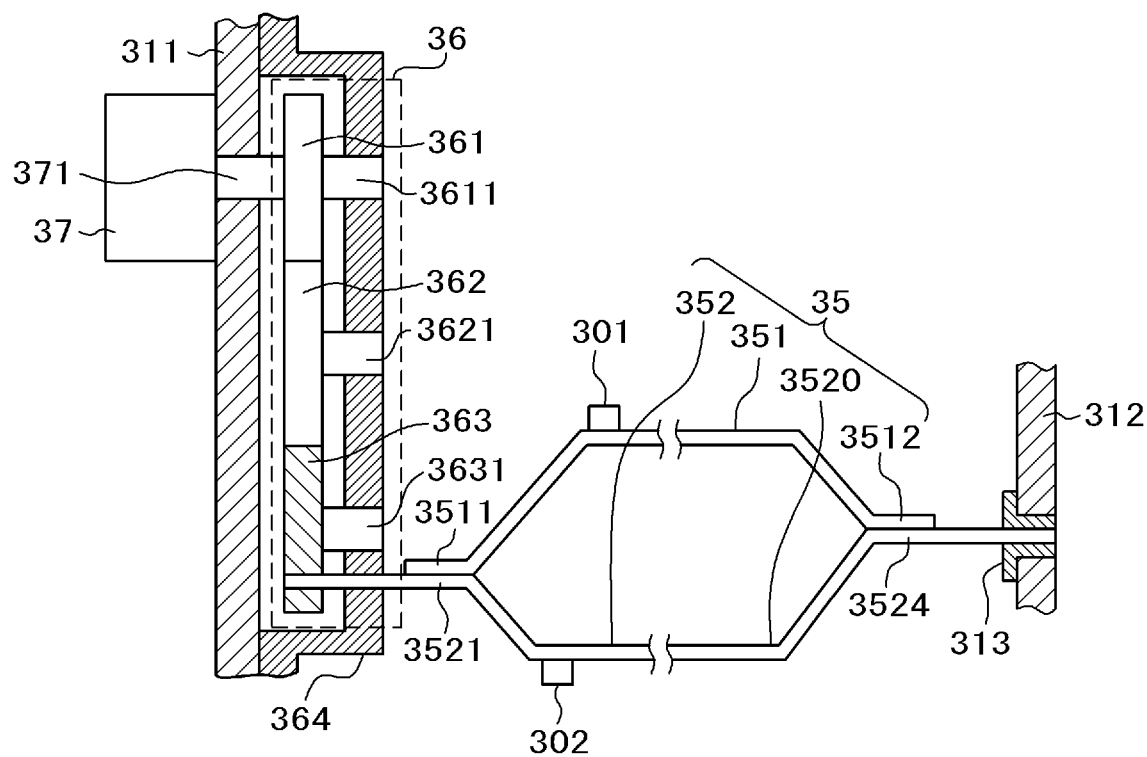
FIG. 4 is a front view of a seat back frame and a torsion bar of a vehicle seat related to Example 1 of the present invention.

FIG. 3 shows the seat frame 31 of a state where the resin panel 32 in FIG. 2 is detached. To the back side of the resin panel 32, a torsion bar 35, a gear mechanism unit 36, and a drive unit 37 are attached, the torsion bar being configured by fixing an upper torsion bar 351 and a lower torsion bar 352 to each other, the gear mechanism unit 36 rotationally driving the torsion bar 35 with one end of the torsion bar 35 being fixed, the drive unit 37 driving the gear mechanism unit 36. The other end of the torsion bar 35 is supported by a bearing 313 that is fixed to the side plate 312. As shown in FIG. 4, to the upper torsion bar 351 and the lower torsion bar 352, limit switches 301 and 302 are attached respectively to detect the contact state to the resin panel 32.

In FIG. 4, the detail of the torsion bar 35, the gear mechanism unit 36, and the drive unit 37 is shown. As the drive unit 37, an electric motor is used. The gear mechanism unit 36 includes a first gear 361, a second gear 362, and a third gear 363, the first gear 361 being attached to an output shaft 371 of the drive unit 37, a distal end portion 3611 of the output shaft 37 being supported by a bracket 364, the second gear 362 being rotatably attached to a shaft 3621 and meshing with the first gear 361, the shaft 3621 being fixed to and supported by the bracket 364, the third gear 363 being rotatably attached to a shaft 3631 and meshing with the second gear 362, the shaft 3631 being fixed to and supported by the bracket 364.

As shown in FIG. 4, in the present example, it is configured that an end part 3521 of the lower torsion bar 352 is fixed to the third gear 363 so as to be decentered in a position that departs from the shaft 3631, and that the other end part 3524 of the lower torsion bar 352 is supported by the bearing 313 on the side plate 312, the bearing 313 being fixed to a position on the extension line of the shaft 3631 of the third gear 363.

Because the axis of the supporting position shifts between the end part 3524 on the right side of the torsion bar 35 and the end part 3521 on the left side, the shape is different between the upper torsion bar 351 and the lower torsion bar 352.

Figure 5:
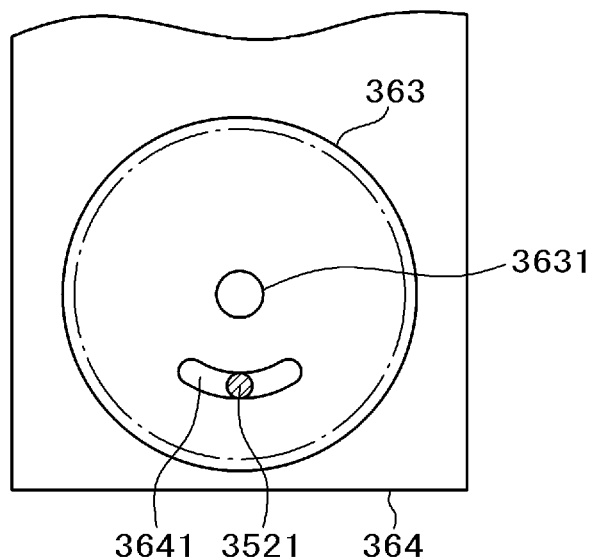
FIG. 5 is a front view of a bracket that defines the swing angle of a torsion bar in a seat back frame of a vehicle seat related to Example 1 of the present invention.

Also, as shown in FIG. 5, in the present example, in the bracket 364, a guide groove 3641 is formed which is for restricting the movable range of the end part 3521 of the lower torsion bar 352 fixed to the third gear 363. The guide groove 3641 is a long hole having the center of the radius of curvature at the center of the shaft 3631 of the third gear 363, the rotation range of the end part 3521 of the lower torsion bar 352 fixed to the third gear 363 is restricted by this guide groove 3641, and the swing angle of the torsion bar 35 can be controlled.

Both end parts 3511 and 3512 of the upper torsion bar 351 are fixed by welding to the lower torsion bar 352 whose end parts 3521 and 3524 of both sides are supported by the third gear 363 and the side plate 312.

When the drive unit 37 is rotationally driven with such configuration, the first gear 361, the second gear 362, and the third gear 363 rotate. Accompanying this rotation of the third gear 363, the end part 3521 of the lower torsion bar 352 fixed to the third gear 363 so as to be decentered swings (turns) along the guide hole 3641 formed in the bracket 364 around the shaft 3631 of the third gear 363. On the other hand, the other end part 3524 of the lower torsion bar 352 rotates inside the bearing 313 synchronizing to the rotation of the third gear 363 because the other end part 3524 is supported by the bearing 313 that is fixed on the extension line of (concentrically to) the axis of the shaft 3631 of the third gear 363 on the side plate 213.

As described above, by rotationally driving the third gear 363 and turning the lower torsion bar 352, the lower torsion bar 352 and the upper torsion bar 351 turn around the axis of the shaft 3631 of the third gear 363 and the axis of the end part 3524 of the lower torsion bar 352. The range where the lower torsion bar 352 and the upper torsion bar 351 turn is determined by a range (the position and the length of the guide groove 3641) the end part 3521 of the lower torsion bar 352 swings along the guide groove 3641 formed in the bracket 364.

Further, although the configuration of using the first gear 361, the second gear 362, and the third gear 363 was shown in FIG. 4, if it is not detrimental to arrangement of the drive unit 37, instead of using the second gear 362, it is possible to dispose the first gear 361 closely to the third gear 363 and to drive the third gear 363 directly by the first gear 361. Furthermore, it is also possible to arrange a fourth gear between the first gear 361 and the second gear 362, or between the second gear 362 and the third gear 363.

Also, with respect to the second gear 362 and the third gear 363, it is not necessary to shape the teeth over the entire circumference, and the teeth may be shaped only in a portion of the angle required for turning the torsion bar 35.

Further, the gear mechanism unit 36 may be substituted by a power transmission mechanism that combines a timing belt and pulleys or a chain and sprockets.

According to the present example, in such configuration, in addition, it is configured to detect intermediate position of turning movement of the upper torsion bar 351 and the lower torsion bar 352 using the limit switches 301 and 302, and to stop the turning movement.

That is to say, it is configured to restrict the turning range of the upper torsion bar 351 and the lower torsion bar 352 by stopping the turning movement at both ends by the guide groove 3641 formed in the bracket 364, and further by stopping the turning movement at an intermediate position of the turning movement of the upper torsion bar 351 and the lower torsion bar 352. Thereby, it is configured to stop the turning movement of the torsion bar 35 at 3 positions.

Figure 6:
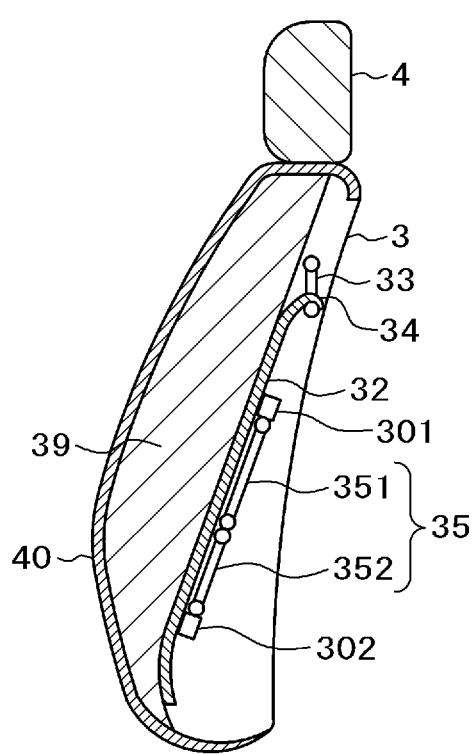
FIG. 6 is a cross-sectional view of a seat back in a state where a torsion bar does not press a resin plate in a seat back of a vehicle seat related to Example 1 of the present invention.

FIG. 6 is the A-A cross-sectional view of the seat back 3 in FIG. 1. In FIG. 6, illustration of the seat frame 31 shown in FIG. 2 and FIG. 3 is omitted in order to simplify explanation. FIG. 6 shows a state where both of the upper torsion bar 351 and the lower torsion bar 352 contact the resin panel 32 and stop. The resin panel 32 is supported by that the hook 34 formed at the upper end is hooked by the spring wire 33.

In this state, both of the limit switch 301 fixed to the upper torsion bar 351 and the limit switch 302 fixed to the lower torsion bar 352 are ON (or both are OFF). When ON signals (or OFF signals) of both of the limit switches 301 and 302 are received and driving by the drive unit 37 is stopped, both of the upper torsion bar 351 and the lower torsion bar 352 contact the resin panel 32. In this state, both of the upper torsion bar 351 and the lower torsion bar 352 are placed on to the resin panel 32. In this state, both of the upper torsion bar 351 and the lower torsion bar 352 are not positively pressed to the resin panel 32, the urethane pad 39 and the trim cover 40 that covers the surface of the urethane pad 39 become a flat state, and the lumbar portion and the pelvic portion of the occupant seated on the seat 1 can be pressurized evenly.

Figure 7:
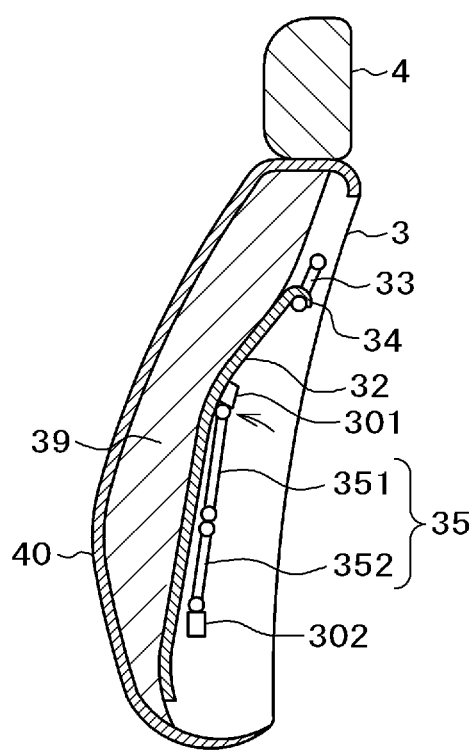
FIG. 7 is a cross-sectional view of a seat back showing a state where the upper part of a resin plate is pressed by a torsion bar of the upper side in a seat back of a vehicle seat related to Example 1 of the present invention.

On the other hand, FIG. 7 shows a state where the drive unit 37 is rotationally driven to turn the torsion bar 35 to the direction of the arrow and the resin panel 32 is pressed forward by the upper torsion bar 351. Thus, by pressing forward the resin panel 32 by the upper torsion bar 351, the lumbar portion of the occupant seated on the seat 1 can be pressurized through the urethane pad 39.

Figure 8:
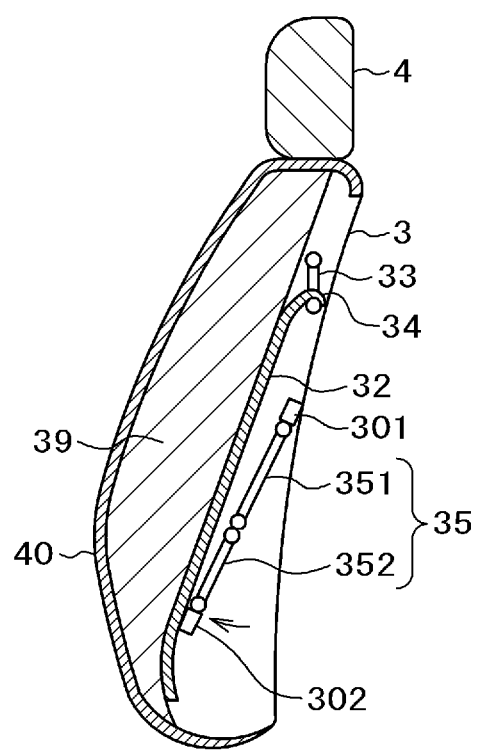
FIG. 8 is a cross-sectional view of a seat back which shows a state where the lower part of a resin plate is pressed by a torsion bar of the lower side in a seat back of a vehicle seat related to Example 1 of the present invention.

Meanwhile, FIG. 8 shows a state where the drive unit 37 is rotationally driven to turn the torsion bar 35 to the direction of the arrow and the resin panel 32 is pressed forward by the lower torsion bar 352. Thus, by pressing forward the resin panel 32 by the lower torsion bar 352, the pelvic portion of the occupant seated on the seat 1 can be pressurized through the urethane pad 39.

In the present example, as the shape of the torsion bar 35, an example of the shape shown in FIGS. 3 and 4 was shown, however, the present invention is not limited to it, and can be used substituting to those having various shapes.

Also, instead of the limit switches 301 and 302, proximity switches, photoelectric switches, pressure sensors, and the like may be used.

According to the present example, the turning stop position of the torsion bar 35 can be selected from 3 states, and it has become possible to respectively pressurize or to simultaneously support the lumbar portion and the pelvic portion of an occupant seated on the seat. Also, the configuration of the mechanism unit for the purpose could be simplified, and the mechanism unit could be configured of fewer components. Further, components could be made common in changing the drive system.

Also, according to the present example, because the intermediate position of turning movement of the torsion bar 35 can be detected from the signals of the limit switches 301 and 302 with excellent reproducibility, the torsion bar 35 can be stopped at a same position every time. Thereby, reproducibility and reliability in measuring the characteristics of the seat back such as measurement of the torso angle can be improved.

Example 2

As Example 2, an example is explained which is configured to detect the number of the rotations of a shaft 372 of the drive unit 37 and to detect a position where the upper torsion bar 351 and the lower torsion bar 352 simultaneously contact the resin panel 32 instead of the limit switches 301 and 302 in Example 1.

Figure 9:
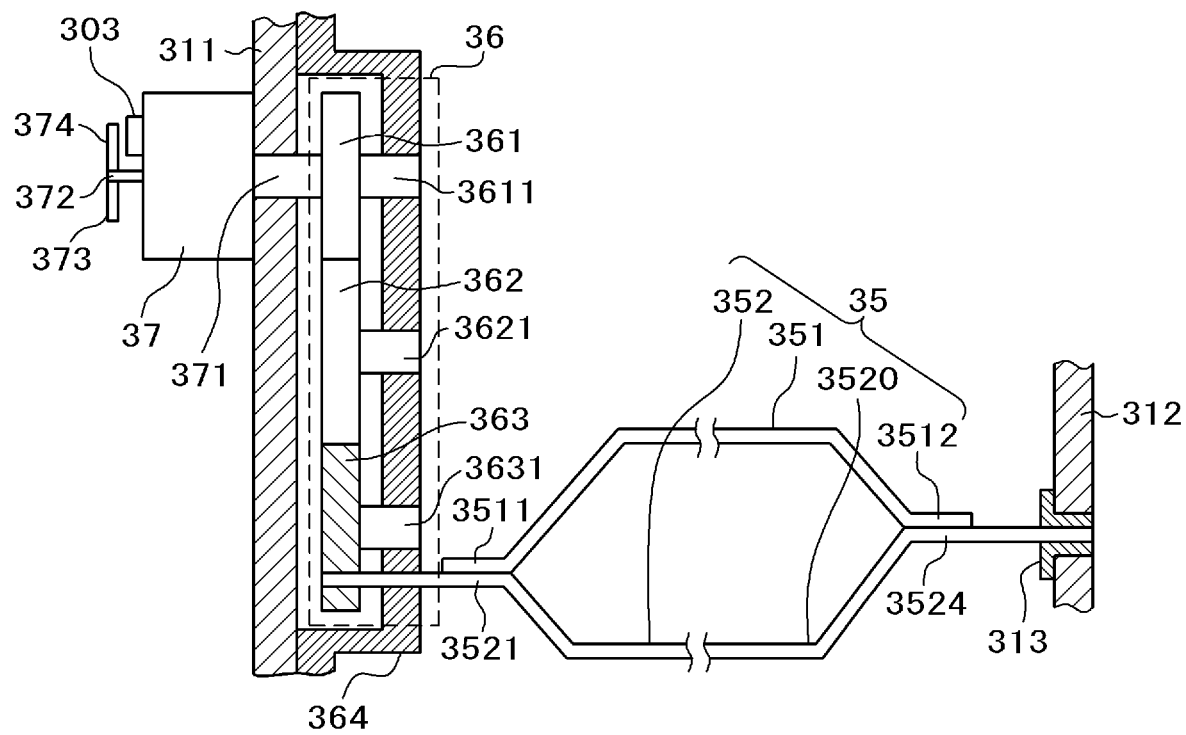
FIG. 9 is a front view of a seat back frame and a torsion bar of a vehicle seat related to Example 2 of the present invention.

In FIG. 9, the detail of the torsion bar 35, the gear mechanism unit 36, and the drive unit 37 in the present example is shown. Because the configuration shown in FIG. 9 is basically same to the configuration shown in FIG. 4 explained in Example 1, explanation will be made only for the different portions. In the configuration shown in FIG. 9, the point different from the configuration shown in FIG. 4 is that the limit switches 301 and 302 are eliminated and a configuration for detecting the number of the rotations of the shaft 372 of the drive unit 37 is added.

As the configuration for detecting the number of the rotations of the shaft 372 of the drive unit 37, a disk 373 is attached to the shaft 372 and rotates together with the shaft 372. A magnet 374 is fixed to the disk 373, the magnetic field by the magnet 374 that rotates together with the disk is detected by a magnetic sensor 303, and thereby the number of the rotations of the shaft 372 is detected.

The drive unit 37 is operated, the number of the rotations of the disk 373 after the torsion bar 35 starts to turn from the state shown in FIG. 7 or the state shown in FIG. 8 is detected by the magnetic sensor 303, and driving by the drive unit 37 is stopped at the time point of reaching a preset rotation speed. Thereby, turning movement of the torsion bar 35 can be stopped in a state where the upper torsion bar 351 and the lower torsion bar 352 simultaneously contact the resin panel 32 as shown in FIG. 6. In this state, both of the upper torsion bar 351 and the lower torsion bar 352 are placed on to the resin panel 32.

In this state, both of the upper torsion bar 351 and the lower torsion bar 352 are not positively pressed to the resin panel 32, the urethane pad 39 and the trim cover 40 that covers the surface of the urethane pad 39 become a flat state, and the lumbar portion and the pelvic portion of the occupant seated on the seat 1 can be pressurized evenly.

Also, according to the present example, because the number of the rotations of the disk 373 until stopping the drive unit 37 can be set optionally, the intermediate stop position of the torsion bar 35 can be set optionally according to the preference of the occupant.

Further, although the disk 373 and the magnetic sensor 303 were arranged outside the drive unit 37 in the configuration shown in FIG. 9, it may be configured to incorporate a Hall IC in the inside of the drive unit 37 instead of the magnetic sensor 303 and to detect the number of the rotations of the drive unit 37. Furthermore, in this case also, because the number of the rotations of the drive unit 37 detected by the Hall IC until stopping the drive unit 37 can be set optionally, the intermediate stop position of the torsion bar 35 can be set optionally according to the preference of the occupant.

According to the present example, the turning stop position of the torsion bar 35 can be selected from 3 states, and it has become possible to respectively pressurize or to simultaneously support the lumbar portion and the pelvic portion of an occupant seated on the seat 1. Also, the configuration of the mechanism unit for the purpose could be simplified, and the mechanism unit could be configured of fewer components. Further, components could be made common in changing the drive system.

Example 3

As Example 3, an example is explained which is configured to detect rotation of the gear of the gear mechanism unit 36 and to detect a position where the upper torsion bar 351 and the lower torsion bar 352 simultaneously contact the resin panel 32 instead of the limit switches 301 and 302 in Example 1.

Figure 10:
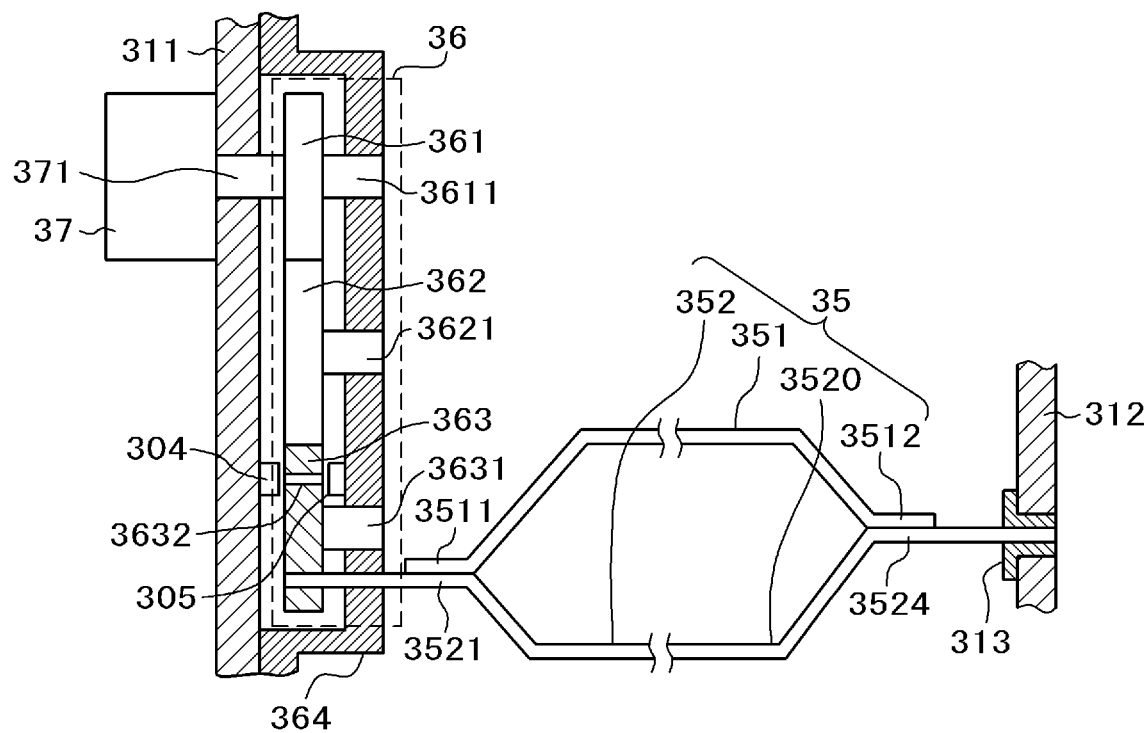
FIG. 10 is a front view of a seat back frame and a torsion bar of a vehicle seat related to Example 3 of the present invention.

In FIG. 10, the detail of the torsion bar 35, the gear mechanism unit 36, and the drive unit 37 in the present example is shown. Because the configuration shown in FIG. 10 is basically same to the configuration shown in FIG. 4 explained in Example 1, explanation will be made only for the different portions. In the configuration shown in FIG. 10, the point different from the configuration shown in FIG. 4 is that the limit switches 301 and 302 are eliminated and a configuration for detecting rotation is added to the third gear 363 of the gear mechanism unit 36.

In concrete terms, a hole 3632 is bored in the third gear 363 of the gear mechanism unit 36, a light projector 304 is arranged on one side of the hole 3632, and a light receiver 305 is arranged on the opposite side. With such configuration, it is configured that light having been emitted from the light projector 304 and having passed through the hole 3632 is detected by the light receiver 305, thereby it is detected that the third gear 363 has rotated by a predetermined angle, and driving by the drive unit 37 is stopped.

The hole 3632 bored in the third gear 363 is arranged at such position that light having been emitted from the light projector 304 can be detected by the light receiver 305 arranged on the opposite side in a state where the upper torsion bar 351 and the lower torsion bar 352 simultaneously contact the resin panel 32.

Thereby, turning movement of the torsion bar 35 can be stopped in a state where the upper torsion bar 351 and the lower torsion bar 352 simultaneously contact the resin panel 32 as shown in FIG. 6. In this state, both of the upper torsion bar 351 and the lower torsion bar 352 are placed on the resin panel 32. In this state, both of the upper torsion bar 351 and the lower torsion bar 352 are not positively pressed to the resin panel 32, the urethane pad 39 and the trim cover 40 that covers the surface of the urethane pad 39 become a flat state, and the lumbar portion and the pelvic portion of the occupant seated on the seat 1 can be pressurized evenly.

According to the present example, the turning stop position of the torsion bar 35 can be selected from 3 states, and it has become possible to respectively pressurize or to simultaneously support the lumbar portion and the pelvic portion of an occupant seated on the seat 1. Also, the configuration of the mechanism unit for the purpose could be simplified, and the mechanism unit could be configured of fewer components. Further, components could be made common in changing the drive system.

Example 4

In the present example, in the configuration explained using FIG. 1 to FIG. 4 in Example 1, it is configured that the intermediate position of turning movement of the upper torsion bar 351 and the lower torsion bar 352 namely a state where the upper torsion bar 351 and the lower torsion bar 352 simultaneously contact the resin panel 32 (a resin panel 132 in the present example) can be recognized by the occupant seated. However, in the present example, such the limit switches 301 and 302 as shown in FIG. 4 in Example 1 are not provided in the upper torsion bar 351 and the lower torsion bar 352.

Figure 11A:
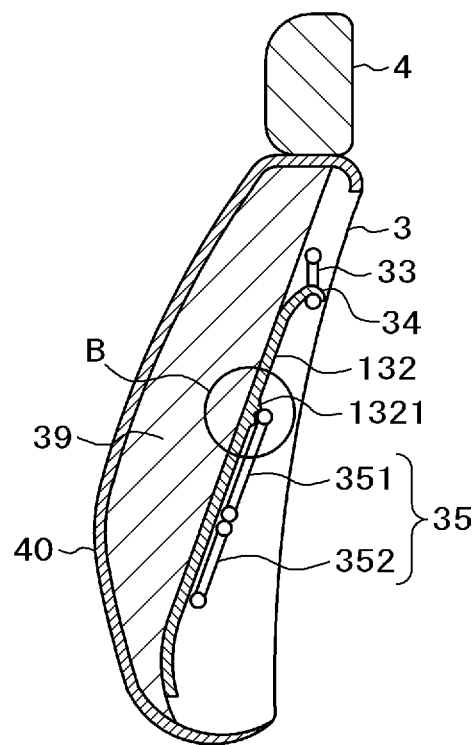
FIG. 11A is a cross-sectional view of a seat back of a state where both of torsion bars of the upper side and the lower side contact a resin plate in a seat back of a vehicle seat related to Example 4 of the present invention.

FIG. 11A is the A-A cross-sectional view of the seat back 3 in FIG. 1. In FIG. 11A, illustration of such the seat frame 31 shown in FIG. 2 and FIG. 3 as explained in Example 1 is omitted in order to simplify explanation. FIG. 11A shows a state where both of the upper torsion bar 351 and the lower torsion bar 352 contact the resin panel 132. The resin panel 132 is supported by that the hook 34 formed at the upper end is hooked by the spring wire 33.

Figure 11B:
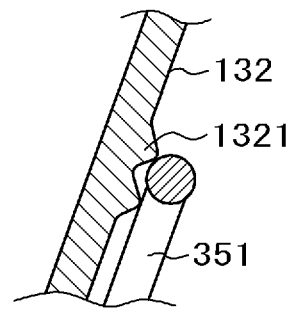
FIG. 11B is an enlarged view of the part B in FIG. 11A of a state where both of torsion bars of the upper side and the lower side contact a resin plate in a seat back of a vehicle seat related to Example 4 of the present invention.

FIG. 11B shows an enlarged view of a portion surrounded by a circle B of FIG. 11A. An unevenness part 1321 is formed at a portion of the resin panel 132 where the upper torsion bar 351 contacts.

That is to say, in the present example, as shown in FIG. 11A and FIG. 11B, the unevenness part 1321 is arranged at a portion where the upper torsion bar 351 contacts the resin panel 132 in a state where both of the upper torsion bar 351 and the lower torsion bar 352 contact the resin panel 132. By turning the torsion bar 35 counterclockwise so as to further press the upper torsion bar 351 to the resin panel 132 in such state as shown in FIG. 11A, the upper torsion bar 351 overrides the unevenness part 1321. Vibration occurs when the upper torsion bar 351 overrides the unevenness part 1321, and it is configured that the vibration is transmitted to the back of the occupant seated on the seat 1 through the urethane pad 39 and the trim cover 40.

The occupant seated on the seat 1 can recognize by this vibration that the upper torsion bar 351 and the lower torsion bar 352 are at the intermediate position of turning movement, and can stop turning movement of the torsion bar 35 at any preferable position by operating a hand switch not illustrated arranged at the side surface of the seat 1 and stopping driving by the drive unit 37.

That is to say, it is configured that the range where the upper torsion bar 351 and the lower torsion bar 352 turn is restricted by the guide groove 3641 formed in the bracket 364 to stop turning movement at the both ends, and that turning movement can be stopped even in the middle of turning movement of the upper torsion bar 351 and the lower torsion bar 352.

In a state the vibration is detected when the upper torsion bar 351 overrides the unevenness part 1321 by turning the torsion bar 35 and a trim switch which is not illustrated is pressed to stop turning movement of the torsion bar 35, both of the upper torsion bar 351 and the lower torsion bar 35 contact the resin panel 132. In this state, both of the upper torsion bar 351 and the lower torsion bar 352 are placed on to the resin panel 132. In this state, both of the upper torsion bar 351 and the lower torsion bar 352 are not positively pressed to the resin panel 132, the urethane pad 39 and the trim cover 40 that covers the surface of the urethane pad 39 become a flat state, and the lumbar portion and the pelvic portion of the occupant seated on the seat 1 can be pressurized evenly.

Figure 12:
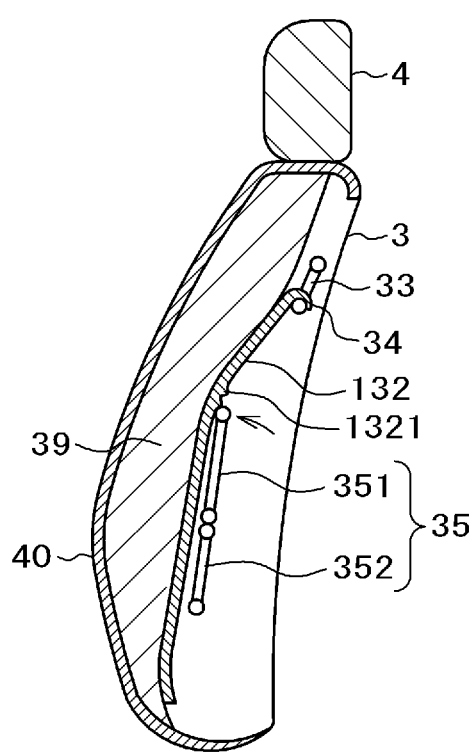
FIG. 12 is a cross-sectional view of a seat back which shows a state where the upper part of a resin plate is pressed by a torsion bar of the upper side in a seat back of a vehicle seat related to Example 4 of the present invention.

On the other hand, FIG. 12 shows a state where the drive unit 37 is rotationally driven to turn the torsion bar 35 in the direction of the arrow, and the resin panel 132 is pressed forward by the upper torsion bar 351. By pressing forward the resin panel 132 thus by the upper torsion bar 351, the lumbar portion of the occupant seated on the seat 1 can be pressurized through the urethane pad 39.

Figure 13:
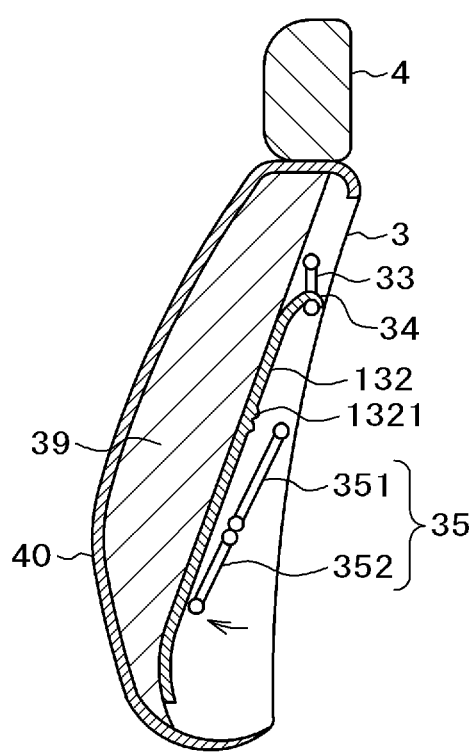
FIG. 13 is a cross-sectional view of a seat back which shows a state where the lower part of a resin plate is pressed by a torsion bar of the lower side in a seat back of a vehicle seat related to Example 4 of the present invention.

Meanwhile, FIG. 13 shows a state the drive unit 37 is rotationally driven to turn the torsion bar 35 to the direction of the arrow and the resin panel 132 is pressed forward by the lower torsion bar 352. By pressing forward the resin panel 132 thus by the lower torsion bar 352, the pelvic portion of the occupant seated on the seat 1 can be pressurized through the urethane pad 39.

In the present example, as the shape of the torsion bar 35, an example of the shape shown in FIGS. 3 and 4 explained in Example 1 was shown, however, the present invention is not limited to it, and can be used substituted to those having various shapes.

Also, in the present example, an example is shown which arranges the unevenness part 1321 at a position where the upper torsion bar 351 contacts the resin panel 132 first when the upper torsion bar 351 is turned and approaches the resin panel 132, however, it may be configured to arrange the unevenness part 1321 at a position where the lower torsion bar 352 contacts the resin panel 132 first when the lower torsion bar 352 is turned and approaches the resin panel 132.

Further, it is also possible to arrange the unevenness part 1321 at both of the position where the upper torsion bar 351 contacts the resin panel 132 first and the position where the lower torsion bar 352 contacts the resin panel 132 first.

According to the present example, the turning stop position of the torsion bar 35 can be set optionally, and it has become possible to respectively pressurize or to simultaneously support the lumbar portion and the pelvic portion of an occupant seated on the seat 1. Also, the configuration of the mechanism unit for the purpose could be simplified, and the mechanism unit could be configured of fewer components. Further, components could be made common in changing the drive system.

Also, according to the present example, the torsion bar 35 can be stopped at a same position every time receiving vibration caused when the torsion bar 35 overrides the unevenness part 1321, and therefore reproducibility and reliability in measuring the characteristics of the seat back 3 such as measurement of the torso angle can be improved.

Example 5

As Example 5, an example is explained which is configured to detect a position where the upper torsion bar 351 and the lower torsion bar 352 simultaneously contact a resin panel 232 using pressure sensors, proximity switches, or limit switches instead of the unevenness part 1321 formed in the resin panel 132 in Example 4.

Figure 14A:
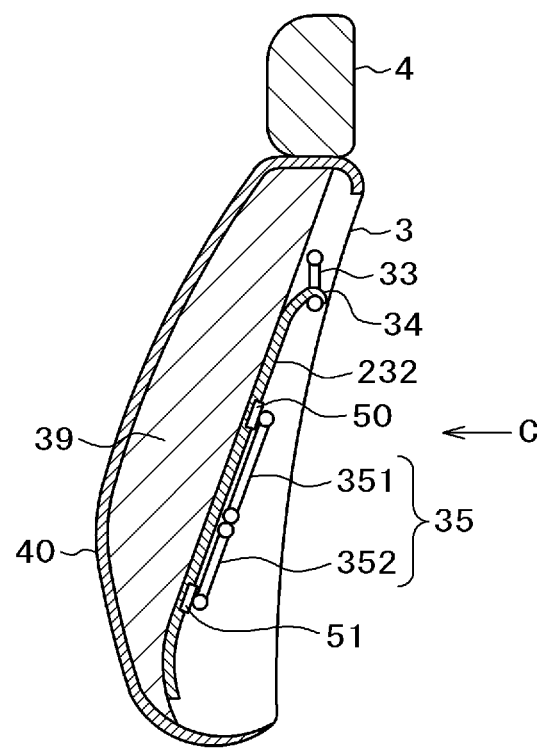
FIG. 14A is a cross-sectional view of a seat back of a state where both of torsion bars of the upper side and the lower side contact a resin plate in a seat back of a vehicle seat related to Example 5 of the present invention.

FIG. 14A shows a cross-sectional view of the torsion bar 35 in the present example. Because the configuration shown in FIG. 14A is basically same to the configuration shown in FIG. 11A explained in Example 4, explanation will be made only for the different portions. In the configuration shown in FIG. 14A, the point different from the configuration shown in FIG. 11A is that the unevenness part 1321 of the resin panel 132 in in FIG. 11A is eliminated, and a sensor 50 for detecting that the upper torsion bar 351 is in contact with the resin panel 232 and a sensor 51 for detecting that the lower torsion bar 352 is in contact with the resin panel 232 are attached to the resin panel 232 side. As the sensors 50 and 51, a pressure sensor, a proximity sensor, or a limit switch can be used.

Figure 14B:
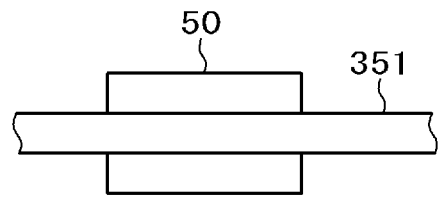
FIG. 14B is a drawing as viewed along the arrow C in FIG. 14A of a state where both of torsion bars of the upper side and the lower side contact a resin plate in a seat back of a vehicle seat related to Example 5 of the present invention.
Figure 15:
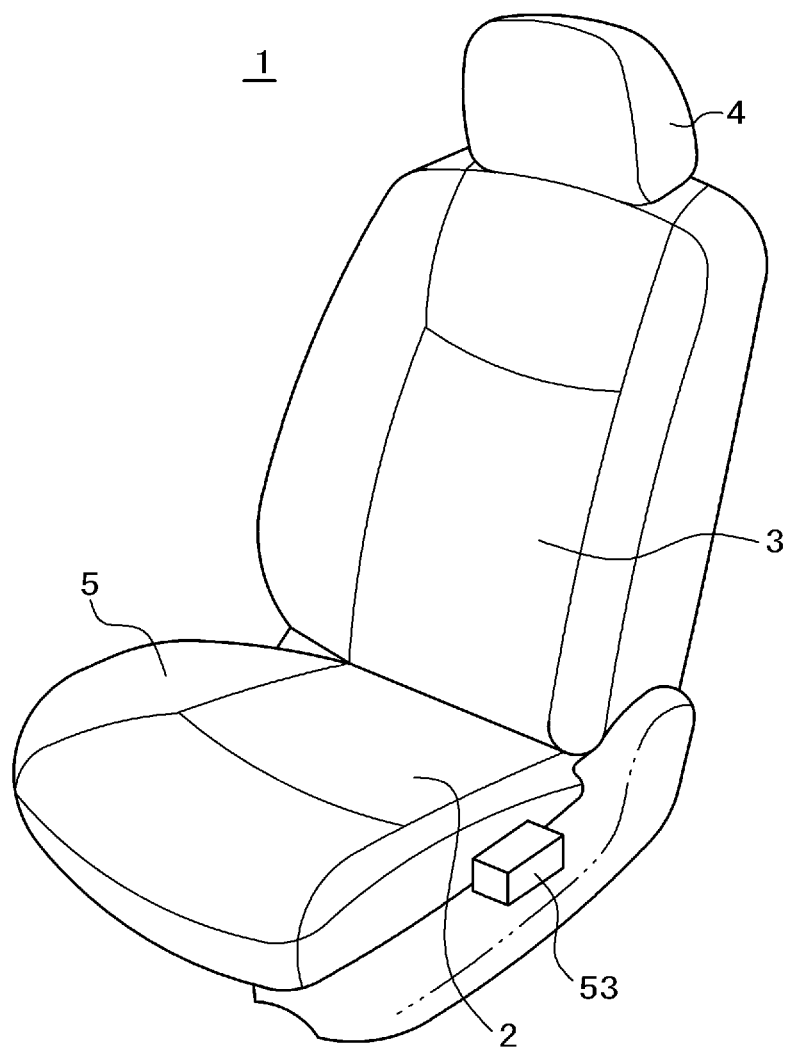
FIG. 15 is a perspective view of a vehicle seat related to Example 5 of the present invention.

When the drive unit 37 is operated to turn the torsion bar 35 and it has come to a state where both of the upper torsion bar 351 and the lower torsion bar 352 contact the resin panel 232 as shown in FIG. 14A, the sensor 50 on the resin panel side detects that the sensor 50 is pressed by the upper torsion bar 351 (such state as shown in FIG. 14B), and the sensor 51 detects that the sensor 51 is pressed by the lower torsion bar 352. Receiving both detection signals of the sensors 50 and 51, the occupant seated on the seat 1 can be notified from such an output unit 53 as shown in FIG. 15 of a state where both of the upper torsion bar 351 and the lower torsion bar 352 contact the resin panel 232 by a buzzer or a lamp. Turning movement of the torsion bar 35 can be stopped by that the occupant having received display of the buzzer or the lamp of the output unit 53 presses a hand switch not illustrated arranged in the seat 1. In this state, both of the upper torsion bar 351 and the lower torsion bar 352 are placed on to the resin panel 232.

In this state, both of the upper torsion bar 351 and the lower torsion bar 352 are not positively pressed to the resin panel 232, the urethane pad 39 and the trim cover 40 that covers the surface of the urethane pad 39 become a flat state, and the lumbar portion and the pelvic portion of the occupant seated on the seat 1 can be pressurized evenly.

According to the present example, the intermediate stop position of the torsion bar 35 can be set optionally according to the preference of the occupant.

Further, according to the present example, because the intermediate position of turning movement of the torsion bar 35 can be detected from signals of the sensors 50 and 51 with excellent reproducibility, the torsion bar 35 can be stopped at a same position every time. Thereby, reproducibility and reliability in measuring the characteristics of the seat back such as measurement of the torso angle can be improved.

Although the inventions achieved by the present inventors have been explained above concretely based on the examples, it is needless to mention that the present invention is not limited to the examples described above, and various alterations are possible within a range not departing from the gist of the present invention. For example, the examples described above have been explained in detail for easy understanding of the present invention, and are not necessarily limited to those provided with all configurations having been explained. Also, with respect to a part of the configuration of each example, addition, deletion, and substitution of other configurations are possible.

REFERENCE SIGNS LIST

1 . . . Vehicle seat
2 . . . Seat cushion

3 . . . Seat back
31 . . . Seat frame
32, 132, 232 . . . Resin panel
33 . . . Spring wire
35 . . . Torsion bar
351 . . . Upper torsion bar
352 . . . Lower torsion bar
36 . . . Gear mechanism unit
37 . . . Drive unit
39 . . . Urethane pad
40 . . . Trim cover
50, 51 . . . Sensor
301, 302 . . . Limit switch
303 . . . Magnetic sensor
304 . . . Light projector
305 . . . Light receiver
1321 . . . Unevenness part

The invention claimed is:

1. A vehicle seat, comprising:
a seat cushion on which an occupant can be seated; and
a seat back against which the occupant seated on the seat cushion can lean back,
wherein the seat back includes:
a urethane pad having a front surface covered with a trim cover,
a pressing unit formed with a shaft extending laterally and an upper pressure portion and a lower pressure portion arranged in a vertical direction with respect to the shaft for pressing the urethane pad from behind, the shaft being rotatable to effect turning movement of the pressing unit, and
a turning movement detection unit that detects an intermediate position of turning movement of the pressing unit between a first position at which an upper part of the urethane pad is pressed forward by the upper pressure portion and a second position at which a lower part of the urethane pad is pressed forward by the lower pressure portion, and
wherein the pressing unit can be placed in a position to support both the upper part of the urethane pad with the upper support portion and the lower part of the urethane pad with the lower support portion by detecting the intermediate position of turning movement of the pressing unit with the turning movement detection unit and stopping the turning movement of the pressing unit in response to the detection.

2. The vehicle seat according to claim 1,
wherein a sheet member is disposed between the urethane pad and the pressure portions of the pressing unit, and
the upper part of the urethane pad is pressed forward through the sheet member by the upper pressure portion in the first position of the pressing unit, the lower part of the urethane pad is pressed forward through the sheet member by the lower pressure portion in the second position of the pressing unit, and the sheet member is simultaneously held against the upper part of the urethane pad by the upper pressure portion and against the lower part of the urethane pad by the lower pressure portion in the intermediate position of turning movement of the pressing unit.

3. The vehicle seat according to claim 2, wherein the turning movement detection unit includes a first detector that detects contact of the upper pressure portion with the sheet member, and a second detector that detects contact of the lower pressure portion with the sheet member.

4. The vehicle seat according to claim 1, further comprising:
a driving unit including an electric motor for rotating the shaft of the pressing unit as a driving source, and
wherein turning movement of the pressing unit is stopped by detecting rotation of the driving source by the turning movement detection unit and then stopping the driving unit.

5. The vehicle seat according to claim 1, wherein the pressing unit includes an upper torsion bar and a lower torsion bar.

6. A vehicle seat, comprising:
a seat cushion on which an occupant can be seated; and
a seat back against which the occupant seated on the seat cushion can lean back,
wherein the seat back includes:
a urethane pad having a front surface covered with a trim cover,
a resin panel disposed to support a part of the urethane pad from behind,
a pressing unit formed with a shaft extending laterally and an upper pressure portion and a lower pressure portion arranged in a vertical direction with respect to the shaft, the shaft being rotatable to effect turning movement of the pressing unit, and
a turning movement detection unit that detects turning movement of the pressing unit, and
wherein the pressing unit is configured to press forward an upper part of the urethane pad through the resin panel using the upper pressure portion by rotating the shaft of the pressing unit in one direction, to press forward a lower part of the urethane pad through the resin panel using the lower pressure portion by rotating the shaft of the pressing unit in a direction opposite to the one direction, and to hold the resin panel simultaneously against the upper part of the urethane pad using the upper pressure portion and against the lower part of the urethane pad using the lower pressure portion by detecting an intermediate position of turning movement of the pressing unit with the turning movement detection unit while rotating the shaft of the pressing unit in the one direction or the opposite direction to turn the pressing unit and then stopping turning movement of the pressing unit in response to the detection.

7. The vehicle seat according to claim 6, wherein the turning movement detection unit includes a first detector that detects contact of the upper pressure portion with the resin panel, and a second detector that detects contact of the lower pressure portion with the resin panel.

8. The vehicle seat according to claim 6, further comprising:
a driving unit including an electric motor for rotating the shaft of the pressing unit as a driving source, and
wherein turning movement of the pressing unit is stopped by detecting rotation of the driving source by the turning movement detection unit and then stopping the driving unit.

9. The vehicle seat according to claim 6, wherein the pressing unit includes an upper torsion bar and a lower torsion bar.

10. A vehicle seat, comprising:
a seat cushion on which an occupant can be seated; and
a seat back against which the occupant seated on the seat cushion can lean back,
wherein the seat back includes:
a urethane pad having a front surface covered with a trim cover,
a pressing unit formed with a shaft extending laterally and an upper pressure portion and a lower pressure portion arranged in a vertical direction with respect to the shaft for pressing the urethane pad from behind, the shaft being rotatable to effect turning movement of the pressing unit, and a turning movement detection unit that detects an intermediate position of turning movement of the pressing unit during changing of the pressing unit between a first state where an upper part of the urethane pad is pressed forward by the upper pressure portion and a second state where a lower part of the urethane pad is pressed forward by the lower pressure portion.

11. The vehicle seat according to claim 10, wherein a resin panel is disposed between the urethane pad and the pressure portions of the pressing unit, and the upper part of the urethane pad is pressed forward through the resin panel by the upper pressure portion in the first state, the lower part of the urethane pad is pressed forward through the resin panel by the lower pressure portion in the second state, and the resin panel is simultaneously held against the upper part of the urethane pad by the upper pressure portion and against the lower part of the urethane pad by the lower pressure portion at the intermediate position of turning movement of the pressing unit.

12. The vehicle seat according to claim 11, wherein the turning movement detection unit includes an unevenness portion formed on a surface of the resin panel, and a vibration is generated by the upper pressure portion hitting the unevenness portion when the upper pressure portion moves along the surface of the resin panel.

13. The vehicle seat according to claim 11, wherein the pressing unit includes an upper torsion bar and a lower torsion bar.

14. A vehicle seat, comprising:

a seat cushion on which an occupant can be seated; and a seat back against which the occupant seated on the seat cushion can lean back, wherein the seat back includes:

a urethane pad having a front surface covered with a trim cover, a resin panel disposed to support a part of the urethane pad from behind, a pressing unit formed with a shaft extending laterally and an upper pressure portion and a lower pressure portion arranged in a vertical direction with respect to the shaft, the shaft being rotatable to effect turning movement of the pressing unit, and a turning movement detection unit that detects a turning movement position of the pressing unit where the resin panel is simultaneously held against an upper part of the urethane pad by the upper pressure portion and against a lower part of the urethane pad by the lower pressure portion.

15. The vehicle seat according to claim 14, wherein the turning movement detection unit includes a first detector that detects contact of the upper pressure portion with the resin panel, and a second detector that detects contact of the lower pressure portion with the resin panel.

16. The vehicle seat according to claim 15, further comprising an output unit that generates an output signal of light, sound, or vibration when the first detector detects contact of the upper pressure portion with the resin panel and the second detector detects contact of the lower pressure portion with the resin panel.

17. The vehicle seat according to claim 14, wherein the pressing unit includes an upper torsion bar and a lower torsion bar.

* * * * *